DE NARD W. B. YOUNG.
APPARATUS FOR RAPIDLY AGING SOLIDIFIED PLASTIC ARTICLES.
APPLICATION FILED JAN. 10, 1916.

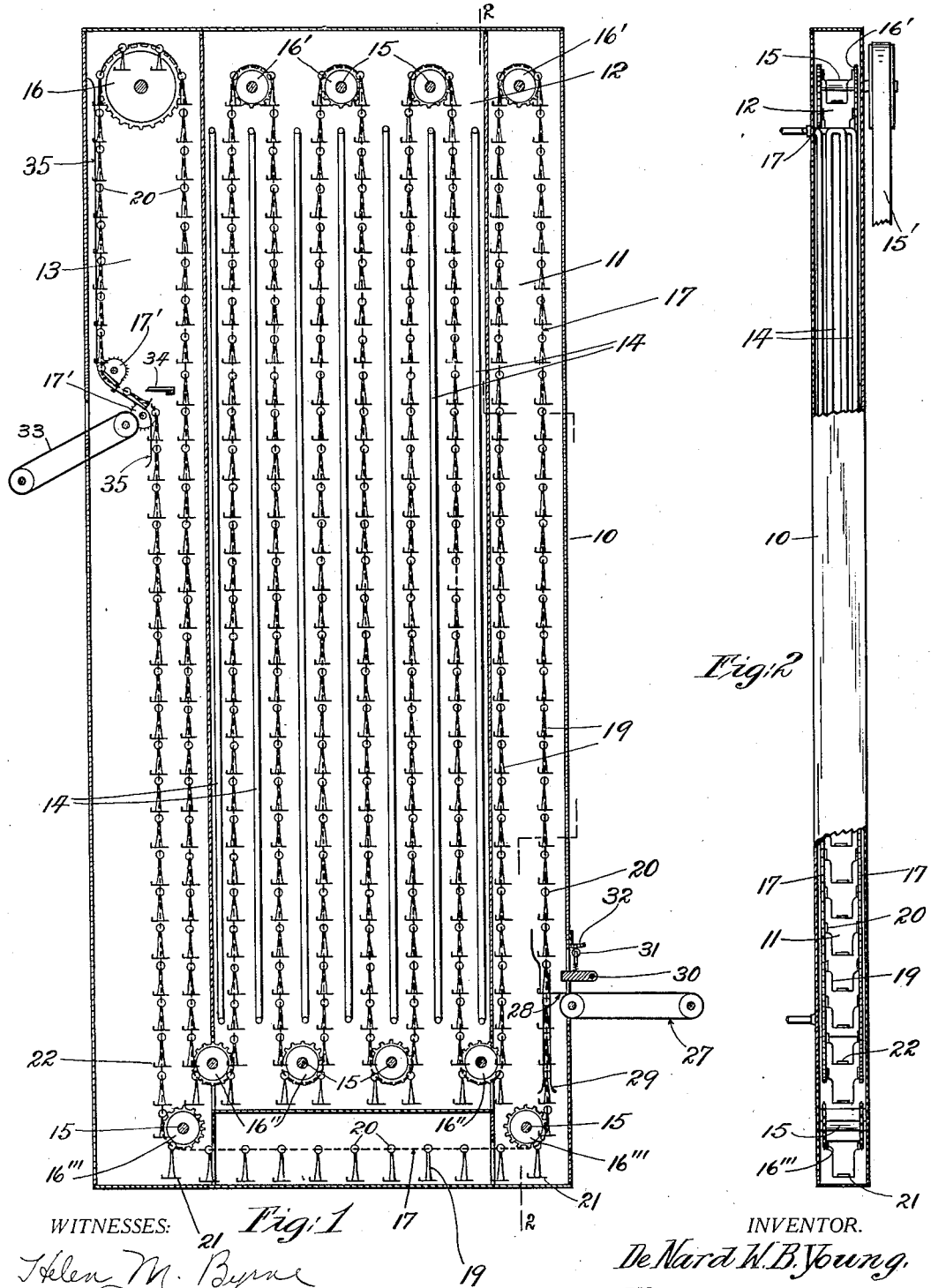

1,246,515.

Patented Nov. 13, 1917.
4 SHEETS—SHEET 2.

WITNESSES:
Helen M. Byrne
D E Vandyke

INVENTOR.
De Nard W. B. Young.
BY William J. Jackson
ATTORNEY.

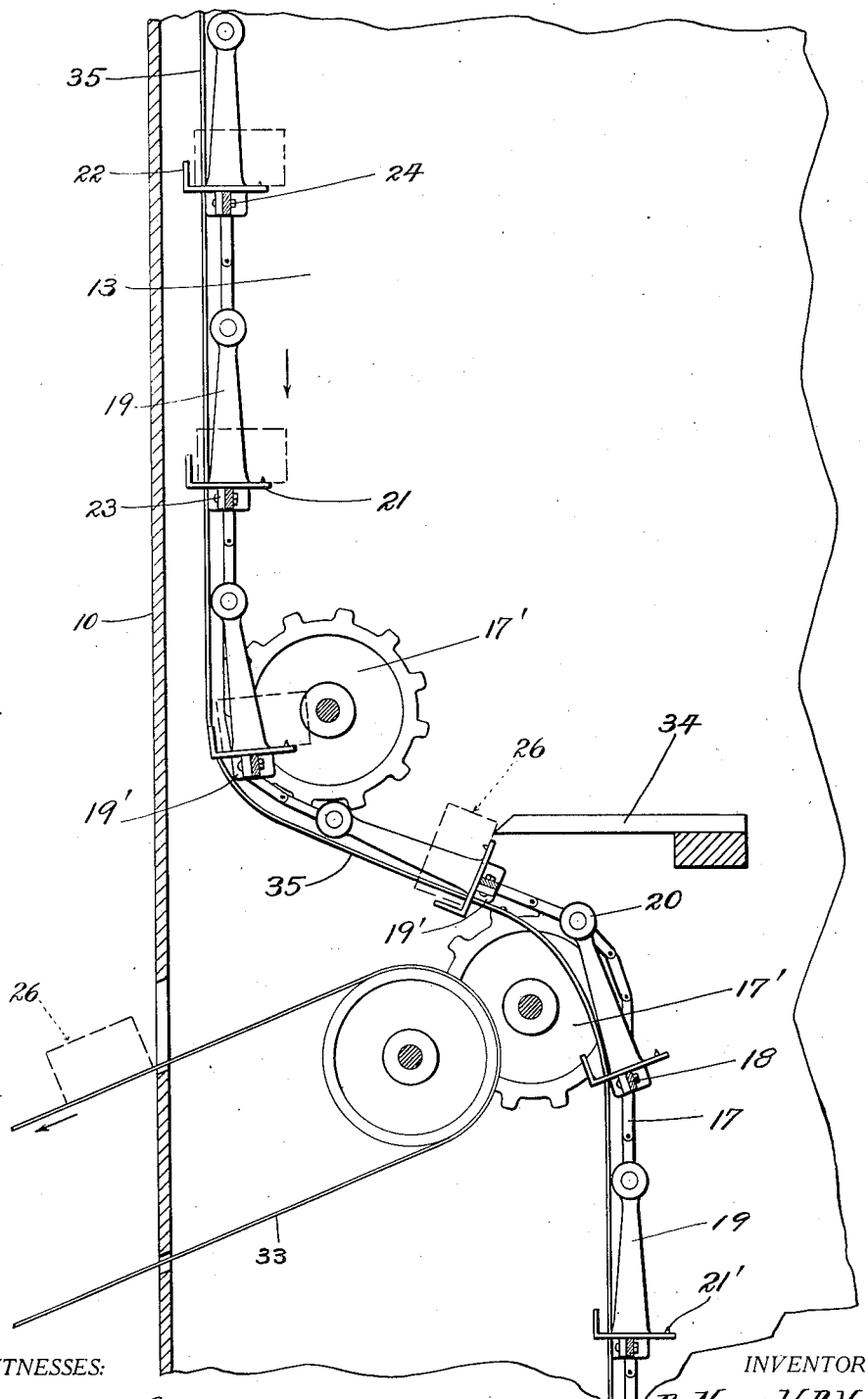

DE NARD W. B. YOUNG.
APPARATUS FOR RAPIDLY AGING SOLIDIFIED PLASTIC ARTICLES.
APPLICATION FILED JAN. 10, 1916.
1,246,515.
Patented Nov. 13, 1917.
4 SHEETS—SHEET 4.
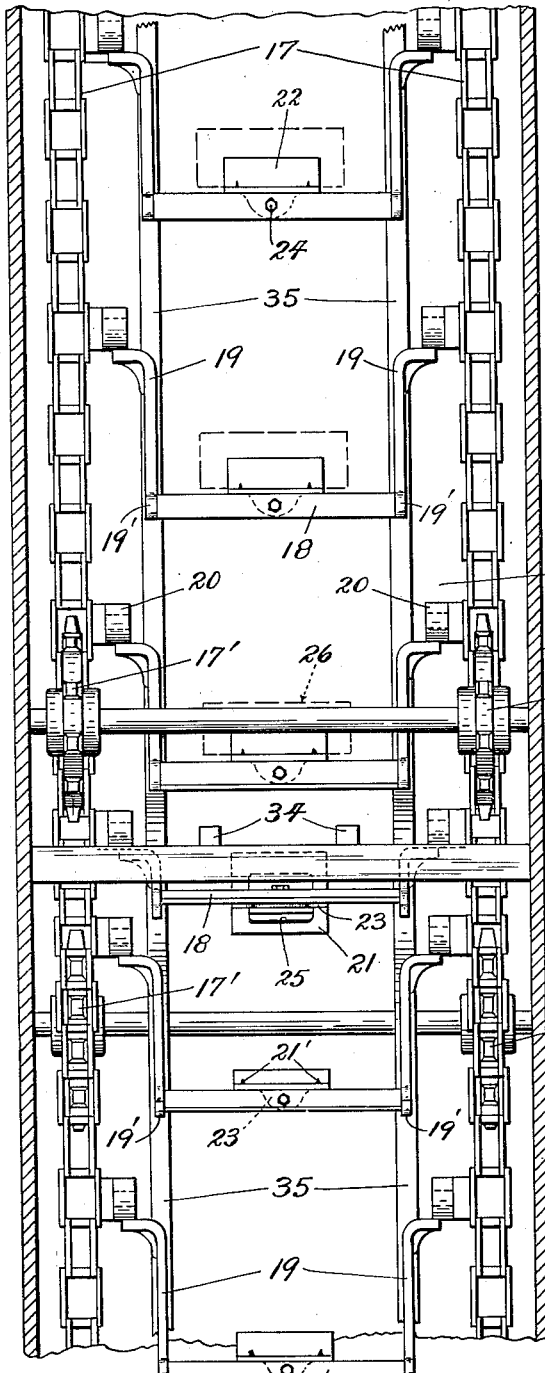
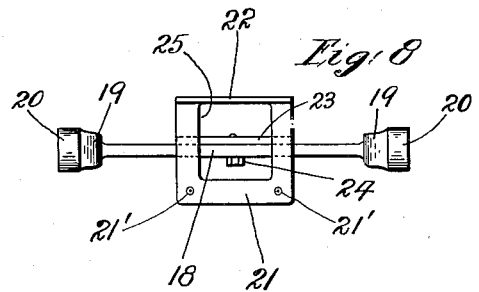
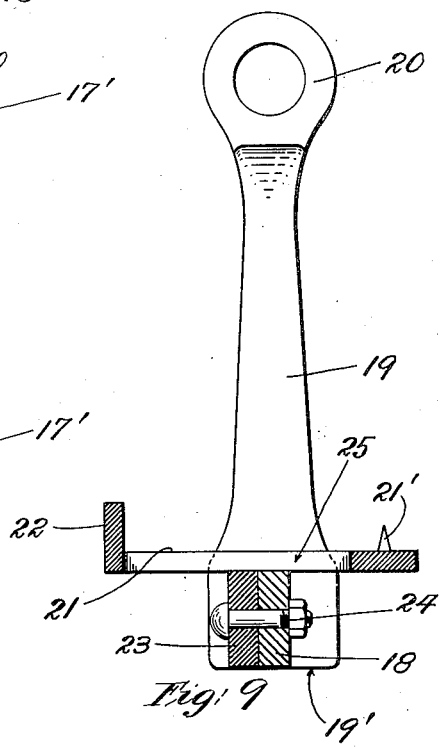
WITNESSES:
Helen M. Byrne
D E Van Dyke
INVENTOR.
De Nard W. B. Young,
BY
William J. Jackson
ATTORNEY.

UNITED STATES PATENT OFFICE.

DE NARD W. B. YOUNG, OF NARBERTH, PENNSYLVANIA, ASSIGNOR TO SOAP WORKS EQUIPMENT COMPANY, A CORPORATION OF PENNSYLVANIA.

APPARATUS FOR RAPIDLY AGING SOLIDIFIED PLASTIC ARTICLES.

1,246,515.           Specification of Letters Patent.      Patented Nov. 13, 1917.

Application filed January 10, 1916. Serial No. 71,150.

*To all whom it may concern:*

Be it known that I, DE NARD W. B. YOUNG, a citizen of the United States, residing at Narberth, in the county of Montgomery and State of Pennsylvania, have invented a certain new and useful Improved Apparatus for Rapidly Aging Solidified Plastic Articles, of which the following is a specification.

The present invention, broadly stated, relates to improved apparatus for rapidly aging solidified plastic articles and has more particular relation to the rapidly aging of bars, blocks or cakes of soap and while the herein disclosed apparatus is adapted for the rapid aging of other solidified plastics, it is particularly fitted for the aging of what is termed in the trade bar-soap and for illustrative purposes, the following description will be restricted thereto.

In the manufacture of bar-soap, as now practised, soap is first molded, then cut into slabs and finally cut into elongated bars and placed upon racks where the soap remains for days at a time to dry or age, the length of time depending a great deal upon existing weather conditions. The bars of soap thus dried or aged are then cut into cakes of proper size for commercial use. As thus manufactured, bar-soap is commercially unsatisfactory for a number of reasons. For instance, by permitting soap to stand for long periods of time, as above described, it develops a surface efflorescence or formation of fine, white, salt crystals. Further, undue penetration of dryness takes place thus causing shrinkage of soap and resultant loss of weight. Still further, the bars of soap often become distorted or mis-shaped through long standing and perfume used for scenting the soap rapidly exudates. These and other disadvantageous results all tend to render the method now practised exceedingly slow, unsatisfactory and expensive.

This invention has for its principal object to overcome these disadvantageous features and provide improved and novel apparatus for the rapid aging of bar-soap whereby a more commercially valuable product is obtained than is now upon the market, in a much more rapid manner and at considerable less expense. A further object of the present invention is to provide apparatus of the continuous feed and discharge type in which the holders or supports for soap or other solidified plastic articles to be aged are maintained in unchanging position relative to the endless conveyer from the time of receiving the article until the time of discharging the same. A still further object of the present invention resides in the providing of a new and novel feed attachment, new and novel holders or supports for soap or other plastic articles to be aged and in the providing of a new and novel discharge device. A still further object of the present invention is to provide apparatus of the continuous feed and discharge type in which the holders or supports for soap or other solidified plastic articles to be aged may be conducted through a plurality of chambers of which the first chamber contains gaseous matter to partially modify the article surfaces; of which the second chamber contains a static body of air of elevated, constant temperature to develop an investing integument of jelly-like consistency for the article surfaces previously modified; and of which the third chamber contains a cooling atmosphere to fix said investing integument. Other and further objects of the present invention reside in the providing of general details of construction and in the arrangement, connection and construction of parts as will hereinafter more fully appear.

With these and other objects in view the invention consists of the improvements hereinafter described and finally claimed.

The nature, characteristic features and scope of the invention will be more fully understood from the following description taken in connection with the accompanying drawings forming part hereof and in which:

Figure 1, is a view in central section of apparatus embodying the invention.

Fig. 2, is a view in section taken upon the line 2—2 of Fig. 1.

Fig. 5, is a fragmentary view in section drawn to an enlarged scale of the feed attachment illustrating a movement hereinafter referred to.

Fig. 6, is a fragmentary view in section drawn to an enlarged scale of the discharge device.

Fig. 7, is an end view of Fig. 6.

Fig. 8, is a top or plan view of a holder or support for a solidified plastic article.

Fig. 9, is a view in central section upon an enlarged scale of a holder or support.

Figure 3:
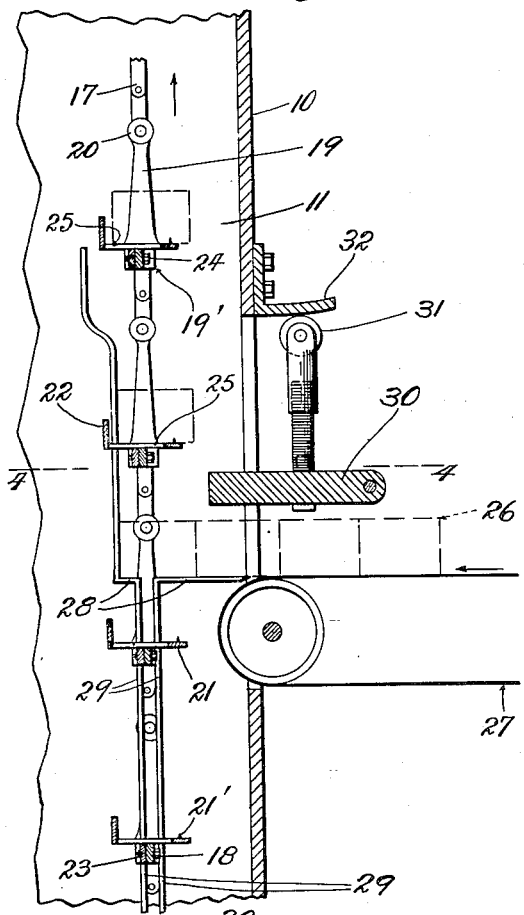
Fig. 3, is a fragmentary view in section drawn to an enlarged scale of the feed attachment.
Figure 5:
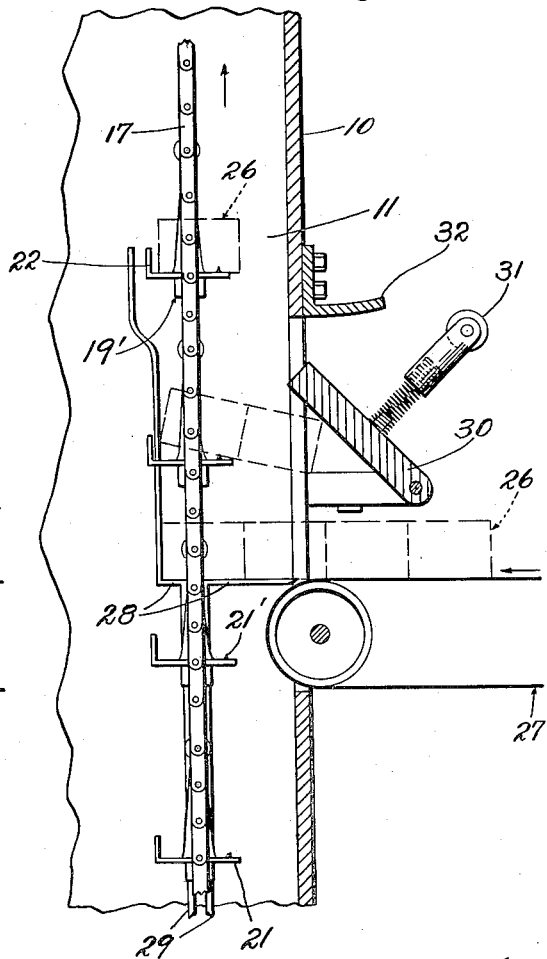
Figure 4:
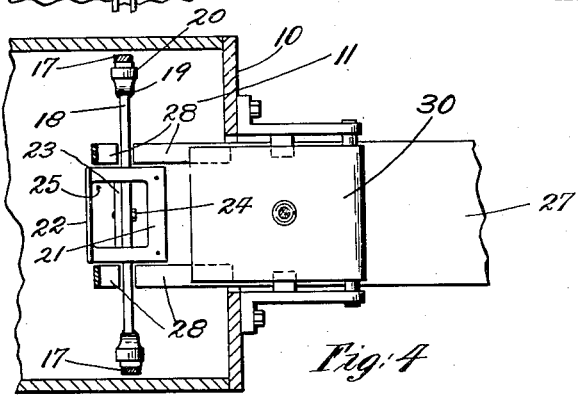
Fig. 4, is a sectional plan view taken upon the line 4—4 of Fig. 3.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangements and organization of the instrumentalities as herein shown and described.

In the drawings 10, designates a generally rectangular structure or housing preferably constructed of insulating material possessed of non-heat conveying properties. This structure interiorly considered is divided transversely into three compartments or chambers 11, 12 and 13. Of these compartments, the one designated 11, constitutes a receiving chamber and the one designated 13, constitutes a discharging chamber. The intermediate or compartment 12, constitutes a heating chamber. In practice, this latter chamber which is closed, has maintained therein a static body of air of elevated, constant temperature. This chamber may be heated by means of steam, heated air, heated water or heated solutions or gases and the like being passed through vertically disposed coils of pipe 14, to provide a closed heating system. I also have in mind the electrical heating of compartment 12. Within the structure or housing 10, both top and bottom thereof are suitably mounted shafts 15—15 upon which are sprocket wheels 16—16'—16"— and 16"'. One of the upper shafts for instance that shaft located in compartment 13, may be driven by any suitable means as a belt 15' and this shaft is provided with sprocket wheels 16 which are of larger diameter than are the other sprocket wheels, for a purpose to presntly appear. Endless chain belts 17—17, are present for travel over these various sprocket wheels, preferably in the manner to be now stated. The endless chain belts 17—17, pass first, upwardly through compartment 11, over a pair of the upper sprocket wheels 16' and thence downwardly through said compartment and over a pair of the lower sprocket wheels 16" into compartment 12. From the latter sprocket wheels the chain belts pass alternately upwardly and downwardly over the sprocket wheels 16'—16" in a tortuous manner through compartment 12. In compartment 12, the runs of the endless chain belts are so disposed with respect to the coils of the heating pipes 14, that a coil of pipe is positioned between adjacent ascending and descending chain belt runs in immediate juxtaposition thereto. From compartment 12, the chain belts pass over lower sprocket wheels 16", thence upwardly over large sprocket wheels 16, then downwardly through compartment 13, and then over sprocket wheels 16"' horizontally beneath compartment 12, to compartment 11. The outer runs of said chain belts are thus out of perpendicular alinement with the lower sprocket wheels 16"'. Accordingly, intermediate the height of said compartment 13, pairs of sprocket wheels 17' are present for guiding the outermost runs of said chain belts at an inclination, inwardly so as to bring said outermost runs into perpendicular alinement with sprocket wheels 16"', the purpose of which will presently appear. Pivotally connected to and suspended between the chain belts 17—17 are a multiplicity of soap holders or supports constructed so as to normally hang in a horizontal position during their passage through the above mentioned compartments. Each soapholder comprises a substantially U-shaped hanger preferably formed in one piece and embracing an apertured cross-piece 18, and a pair of uprights 19, slightly bent outwardly at their upper ends and each terminating in a lug 20, apertured to receive a pivot pin for suspending the hanger with respect to the chain belts. Each upright is enlarged or reinforced at its bottom for a purpose to presently appear. Disposed upon and at right angles to each cross-piece 18, is a one-piece saddle embracing a flat plate 21, having an upwardly extended lip 22, at its rear end having a pair of soap engaging points 21', at its front end and having a central, depending, apertured lug 23. This apertured lug is detachably secured to the cross-piece of a hanger as by a bolt 24. The plate 21 is centrally cut away as at 25, in order that little soap resisting surface be present, and at the same time to lighten construction. The endless chain belts equipped with complemental soap-holders as above described will hereinafter be termed the endless conveyer. According to the present method of rapidly aging bar-soap, which is continuous and uninterrupted, there takes place from the time the bars of soap are fed to the apparatus until discharged therefrom, five steps or actions and a description will now be given of these steps in order.

*Feed.*—Soap is first molded as usual, then slabbed and immediately introduced to a cutting machine (not shown in the drawings) and cut into bars, blocks or cakes 26. From the cutting machine, the bar-soap is fed directly to compartment 11, by means of an apron 27. The soap as fed is of solidified plastic form, the surface of which is in a semi-crystalline, non-uniform condition. Furthermore, the soap is in a vaporous or moist condition interiorly and exteriorly considered and it is essential that this moist condition be preserved indefinitely so that said soap retains its specific properties and original weight. To that end, I treat soap to rapidly develop a superficial, uniform and translucent film or skin visibly free of crystalline salts and of an infinitesimal penetration. Thus, while the soap surface is modified, the composition of the soap is not altered. The bars of soap are fed to compartment 11, in a positive manner, in abutting positions, by the apron 27. In practice, a single bar of soap is fed forwardly upon oppositely disposed sets of horizontal guides or finger pieces 28, fixed in the same plane with said apron top surface. The finger pieces form continuations of vertical guides 29, and are of proper size to hold or support but a single cake. As the endless conveyer moves upward between said opposed sets of finger pieces 28, a bar of soap is bodily lifted from off said fingers by the saddle of a hanger and another bar of soap is moved upon said finger pieces by the apron 27. It sometimes happens that the cutting machine fails to entirely sever adjacent bars of soap so that when the saddle lifts its proper bar of soap a second bar is attached thereto. Should this condition continue jamming of the apparatus parts with likelihood of breakage thereof is present. To guard against this, I have provided immediately above the apron 27, a pivotal, horizontally disposed trip-plate 30, which carries a spring-pressed vertical member having at its free end a roller 31. Normally this roller engages the underside of a lip 32, which is fixed to the housing or casing 10 and this maintains plate 30, in position for tripping. When two engaging bars of soap move upward, the outermost bar abuts against the underside of plate 30, with the result that the plate is moved around its pivot point so that the roller 31, rides outward or away from retaining lip 32. This movement of plate 30, is sufficient notice to the operator in charge to immediately stop the operation of the apparatus. It may be here stated that the tension of the spring for the roller 31, is such that should adjacent bars of soap but slightly adhere the same may be caused to separate by said plate 30, without tripping thereof. In such case the bar of soap adhering to the upwardly moving bar is retained against upward movement.

*Partially modifying soap surface.*—With the feeding of the bars of soap to the endless conveyer, the movement of soap is first upwardly and then downwardly through compartment 11. This compartment, preferably inclosed, contains gaseous matter, for instance air, the purpose of which is to partially modify the surfaces of the bars of soap by absorbing therefrom a proper amount of surface moisture or vapor.

*Developing a jelly-like investing integument.*—The bars of soap with their surfaces thus partially modified pass into and through closed compartment 12, which has therein a static body of air, of elevated and constant temperature. Travel of soap through this compartment is at a rate of speed, proportionate to the shortest period of time to which soap may be subjected to a maximum heat of predetermined degree in order to secure the result desired. The desired result is that of developing a jelly-like investing integument of infinitesimal penetration. It is essential to secure this jelly-like envelop in the shortest possible time so that the specific properties and weight of the soap is not changed.

Figure 10:
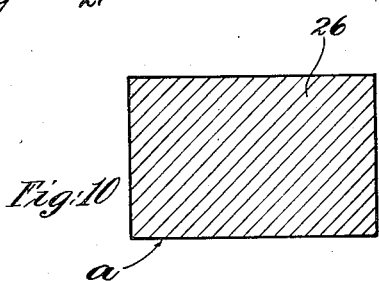
Fig. 10, is a view in section of a finished product as formed according to the present invention.

*Fixing the investing integument.*—The bars of soap now pass into and partially through compartment 13, also preferably inclosed. This compartment contains a cooling atmosphere, the purpose of which is to fix the jelly-like investing integument so that a permanent, translucent film or skin *a*, see Fig. 10, free of visible crystalline salts results. Such soap-film or skin serves to prevent atmosphere penetration and further serves to prevent escape of internal moisture or vaporous matter. Such film or skin also serves to retard the rapid exudation of perfume used in scenting the soap.

*Discharge.*—The bars, blocks or cakes of soap are now ready to be discharged from compartment 13, to an apron 33, disposed at an inclination to the inclined run of the endless conveyer. Suitably mounted within compartment 13, and in juxtaposition to that portion of the endless conveyer which moves at an inclination over the sprocket wheel 17 are a pair of fixed finger-pieces 34, preferably of wood, for overturning individual bars of soap to cause the same to fall upon the apron 33. These finger-pieces are so disposed that the bars, blocks or cakes of soap in their travel abut thereagainst and as the endless conveyer moves along, a soap bar is lifted free of a plate 21, and is overturned upon the apron 33. As clearly shown in Fig. 7, the fingers straddle a plate 21, of a hanger and engage the respective end portions of a bar of soap and as the hangers are U-shaped, the soap bars may be readily overturned onto the apron 33, through the moving hanger. In order that the hangers may be bodily shifted to follow the inclined runs of the endless chain belts a pair of fixed guides 35, are present. As shown in Fig. 7, these guides comprise thin, narrow strips positioned one upon each side of the conveyer and in the path of travel of a hanger upright, so that the enlargements or reinforcements of the hanger uprights track upon said guides 35.

With the discharge of soap from the apparatus, it is sufficiently cooled to permit of ready handling. It may be here stated that soap after discharge from the apparatus may be passed by conveyer 33, to a stamping or embossing machine, to a press, to a wrapping machine or the soap may be immediately packed. As regards stamping or embossing, the soap surface is admirably fitted by my process to readily accept suitable imprints. The same is true should it be desired to shape the soap in a press. As regards wrapping, it may be stated that the soap will not stick to its wrapper which, commercially considered, is an important item. It may be further stated that as discharged from the apparatus, soap may be readily handled for any of the above purposes without becoming mis-shaped. It is to be further noted at this point that it is sometimes desirable to imprint or emboss upon soap at the time of cutting the same into bars, blocks or cakes, a suitable name, design or the like. In such event, soap so imprinted or embossed may be treated in accordance with the herein described method without deleterious effect thereto.

By the above described continuous and uninterrupted method, bar-soap is rapidly aged to provide a commercially valuable commodity in which while the surface thereof is modified, the body retains its original specific properties and weight, which is highly important in the trade. The superficial skin or film being free of visible crystalline salts enhances the appearance of the soap and said skin or film prevents secretion of moisture or vaporous matter with consequent staining of a wrapper as is now a common fault in the trade.

It will now be apparent that I have devised a novel and useful apparatus which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages and that I have in mind the treating of plastic articles other than soap.

What I claim is:

1. Apparatus of the character stated embracing a compartment having therein a static body of air, means for elevating and maintaining constant the temperature of said body of air, an endless conveyer operative for travel through said compartment, a series of free swinging holders mounted upon said conveyer, means for feeding a solidified plastic article into the path of travel of a moving holder, means for tilting a holder to discharging position and independent means for freeing an article from a holder so tilted.

2. Apparatus of the character stated embracing a compartment having therein a static body of air, means for elevating and maintaining constant the temperature of said body of air, an endless conveyer operative for travel through said compartment, a series of free swinging holders mounted upon said conveyer, means for feeding a solidified plastic article into the path of travel of a holder, means for sustaining said article in such position, means for guiding a holder to such positioned article, means for tilting a holder to discharging position and independent means for freeing an article from a holder so tilted.

3. Apparatus of the character stated embracing a compartment containing gaseous matter, a compartment containing a static body of air of elevated and constant temperature and a compartment containing a cooling atmosphere, an endless conveyer operative for continuous travel through said compartments, a series of free swinging holders mounted upon said conveyer, means for feeding a solidified plastic article into the first mentioned compartment to a position in the path of travel of a holder, means within the last mentioned compartment for tilting a holder to discharging position and independent means for freeing an article from a holder so tilted.

4. Apparatus of the character stated embracing a compartment containing a static body of air, an endless conveyer operatively extending in sinuous form through said compartment, means operative for elevating and maintaining constant the temperature of said body of air, said means being disposed between adjacent runs of said conveyer, means for feeding solidified plastic articles to said conveyer and means operative for discharging said articles after passage through said compartment.

5. Apparatus of the character stated embracing a compartment containing a static body of air, an endless conveyer operatively extending in sinuous form through said compartment, piping for the passage therethrough of an agent for the elevating and maintaining constant the temperature of said body of air, which piping is disposed between adjacent runs of said conveyer, means for feeding solidified plastic articles to said conveyer and means operative for discharging said articles after passage through said compartment.

6. Apparatus of the character stated embracing a compartment containing a static body of air, an endless conveyer operatively extending in sinuous form through said compartment, coiled piping for the passage therethrough of an agent for the elevating and maintaining constant the temperature of said body of air which coiled piping is disposed between adjacent runs of said conveyer, means for feeding solidified plastic articles to said conveyer, and means operative for discharging said article after passage through said compartment.

In testimony whereof, I have hereunto signed my name.

DE NARD W. B. YOUNG.

Witnesses:
ALBERT RYCROFT,
FRANCIS J. BAER.